US010056748B2

(12) United States Patent
Thomas et al.

(10) Patent No.: US 10,056,748 B2
(45) Date of Patent: Aug. 21, 2018

(54) ELECTRICAL BOX SUPPORT

(71) Applicant: Hubbell Incorporated, Shelton, CT (US)

(72) Inventors: Jason Thomas, Mesa, AZ (US); Krzysztof Korcz, Grainger, IN (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/477,568

(22) Filed: Apr. 3, 2017

(65) Prior Publication Data

US 2017/0294768 A1 Oct. 12, 2017

Related U.S. Application Data

(60) Provisional application No. 62/319,525, filed on Apr. 7, 2016.

(51) Int. Cl.
  *H02G 3/12* (2006.01)
  *H02G 3/08* (2006.01)
  *F16M 13/02* (2006.01)

(52) U.S. Cl.
  CPC ............ *H02G 3/121* (2013.01); *F16M 13/02* (2013.01); *H02G 3/081* (2013.01); *H02G 3/128* (2013.01)

(58) Field of Classification Search
  CPC ........ H02G 3/121; H02G 3/128; H02G 3/105; F16M 13/02
  USPC .......................................................... 174/58
  See application file for complete search history.

(56) References Cited

U.S. PATENT DOCUMENTS

| 2,581,755 | A | 1/1952 | Dieffenderfer |
| 2,665,865 | A | 1/1954 | Bell |
| 2,736,450 | A | 2/1956 | Atkinson |
| 3,184,191 | A | 5/1965 | Esoldi |
| 3,337,168 | A | 8/1967 | Albrecht |
| 3,362,667 | A | 1/1968 | Ginsburg |
| 4,183,486 | A | 1/1980 | Esoldi |
| 4,226,393 | A | 10/1980 | Rardin et al. |
| 4,669,371 | A | 6/1987 | Sarazen, Jr. et al. |
| 4,693,438 | A | 9/1987 | Angell |
| 5,494,244 | A | 2/1996 | Walton |
| 5,661,264 | A | 8/1997 | Reiker |
| 6,648,277 | B2 | 11/2003 | De Leu |
| 7,082,728 | B1 | 8/2006 | McConaughy et al. |
| 7,455,266 | B2 | 11/2008 | Faircloth |
| 7,462,775 | B1 | 12/2008 | Gretz |

(Continued)

*Primary Examiner* — Dhirubhai R Patel
(74) *Attorney, Agent, or Firm* — Michael Best & Friedrich, LLP

(57) ABSTRACT

A support is provided for mounting an electrical box in an opening formed in a block. The support includes a planar body configured to be coupled to a first side wall of the electrical box. The body includes at least one side edge. The support further includes a flange coupled to the first side edge of the body and extends substantially perpendicular to a plane of the body. The flange is configured to contact an outer surface of the block and to orient an outer edge of the electrical box relative to the block. The support further includes a retention member that is coupled to the body. The retention member has an end. At least a portion of the retention member is movable from a first configuration to a second configuration in which the portion of the retention member is positioned away from the body and contacts the block.

25 Claims, 10 Drawing Sheets

(56) References Cited

U.S. PATENT DOCUMENTS

| | | |
|---|---|---|
| 8,109,054 B2 | 2/2012 | Thomas et al. |
| 8,220,761 B2 | 7/2012 | Brockelsby et al. |
| 8,739,997 B1 * | 6/2014 | Ploof ................. H02G 3/14 |
| | | 16/282 |
| 8,785,774 B1 * | 7/2014 | Gretz ................. H02G 3/126 |
| | | 174/50 |
| 9,608,419 B2 * | 3/2017 | Korcz ................. F16M 13/02 |
| 2014/0318853 A1 | 10/2014 | Koroz et al. |
| 2015/0263499 A1 | 9/2015 | Korcz et al. |

* cited by examiner

ELECTRICAL BOX SUPPORT

CROSS-REFERENCE TO RELATED APPLICATION

This application claims the benefit of prior-filed, U.S. Provisional Patent Application No. 62/319,525, filed Apr. 7, 2016, the entire contents of which are incorporated herein by reference.

BACKGROUND

The present disclosure relates to electrical boxes, and more specifically to a bracket for supporting an electrical box.

SUMMARY

During construction of a wall it is desirable to securely mount an electrical junction box so that the electrical junction box does not move or shift during construction of the wall or during use after completion of the structure. Numerous mounting devices have been proposed for permanently and/or temporarily mounting electrical boxes in the cavity of a wall during construction. Standard outlet boxes often require mechanical fasteners to secure the electrical box permanently in place to a wall stud or other support structure. The mechanical fasteners are usually positioned to orient the electrical box in the desired location so that the outer edge of the electrical box is flush with the outer face of the wall.

The mounting of electrical boxes in concrete structures generally requires a different mounting assembly for holding the electrical box in position while the wall is being formed. In addition, concrete building materials do not enable the use of fasteners that are used in wood walls and studs since nail, screws, and other fasteners cannot be easily driven into concrete. Hollow concrete blocks provide a particular difficulty in mounting electrical boxes since there are no surfaces that can readily accommodate fasteners.

One manner of mounting an electrical box may include providing a sheet metal form with various tabs that can hold the electrical box in position while the cement or mortar sets. These devices often require the device to be installed during construction of a wall and to be positioned between joints, which can interfere with the structural integrity of the joint. These devices also require the use of cement or mortar to hold the support in place.

In one aspect, a support is provided for mounting an electrical box in an opening formed in a block. The support includes a planar body configured to be coupled to a first side wall of the electrical box. The body has at least one side edge. The support further includes a flange coupled to the first side edge of the body and extends substantially perpendicular to a plane of the body. The flange is configured to contact an outer surface of the block and to orient an outer edge of the electrical box relative to the block. The support further includes a retention member coupled to the body. The retention member has an end. At least a portion of the retention member is movable from a first configuration to a second configuration in which the portion of the retention member is positioned away from the body and contacts the block.

In another aspect, an electrical box assembly includes an electrical box having a first side wall, a second side wall, and an open front positioned between the first side wall and the second side wall. The electrical box assembly further includes a support having a body with at least one side edge. The body is coupled to the first side wall of the electrical box. The support further includes a flange coupled to the side edge of the body. The flange extends substantially perpendicular to a plane of the body. The support further includes a retention member coupled to the body. The retention member has an end. At least a portion of the retention member is movable from a first configuration to a second configuration in which the retention member extends away from the body. The retention member is configured to contact an opposite side of a block from the flange.

In yet another aspect, a method is provided for mounting an electrical box in an opening of a block. The method includes positioning the electrical box and a support in the opening in the block, positioning a flange of the support against an outer surface of the block, and deforming a retention member of the support such that the retention member extends away from a planar body until the retention member contacts an edge of the block.

Other aspects of the application will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
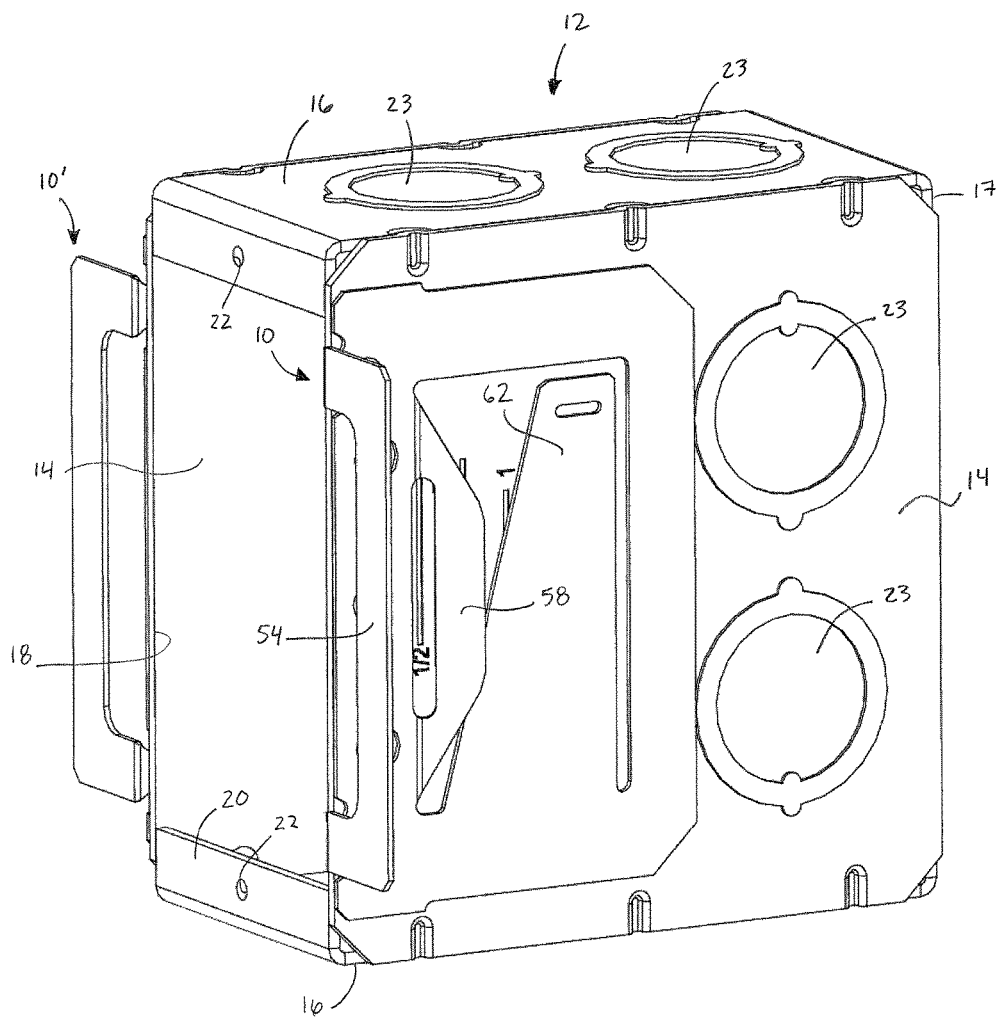
FIG. 1 is a perspective view of support brackets and an electrical box.

FIG. 1 illustrates support members or supports 10 and an electrical box 12. The supports 10 are attached to the electrical box 12. The electrical box 12 can be a standard electrical box with standard dimensions and shape. In the illustrated embodiment, the electrical box 12 is a single gang box having a substantially rectangular configuration. In some embodiments, the electrical box is a multi-gang box.

With continued reference to FIG. 1, the electrical box 12 has a pair of side walls 14, a pair of end walls 16, a back wall 17 and an open front 18 defined by corresponding front edges of the side walls 14 and end walls 16. In the embodiment shown, the electrical box 12 includes a mounting flange 20 extending inwardly from each end wall 16. In the embodiment shown, the mounting flange 20 extends between the side walls 14 to form a lip projecting into the opening 18 in the electrical box. Each mounting flange 20 includes a screw hole 22 for receiving a mounting screw to attach an electrical device (e.g., a wall switch or receptacle—not shown) to the box. An electrical conduit (not shown) can be coupled to the electrical box 12 at any one of a plurality of knockout bosses or stamps 23 to supply wires to the electrical box 12 and the electrical device as known in the art. Although the electrical device is not shown, it is understood that the electrical device can be any suitable electrical wiring device as known in the art that is mounted to an electrical box (e.g., an outlet, a switch, etc.).

Figures 2, 3:
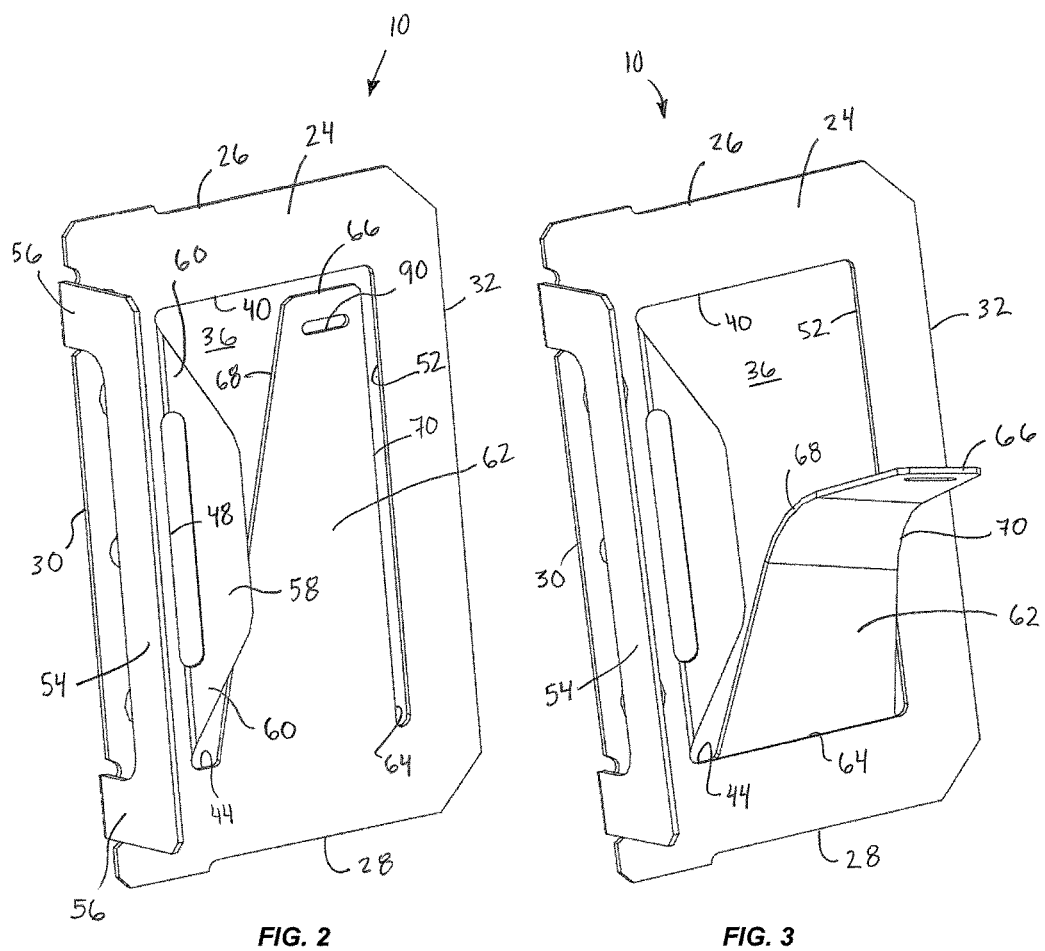
FIG. 2 is a perspective view of one of the support brackets of FIG. 1.
FIG. 3 is a perspective view of the support bracket of FIG. 2, illustrating the retention member in a deflected configuration.
Figure 4:
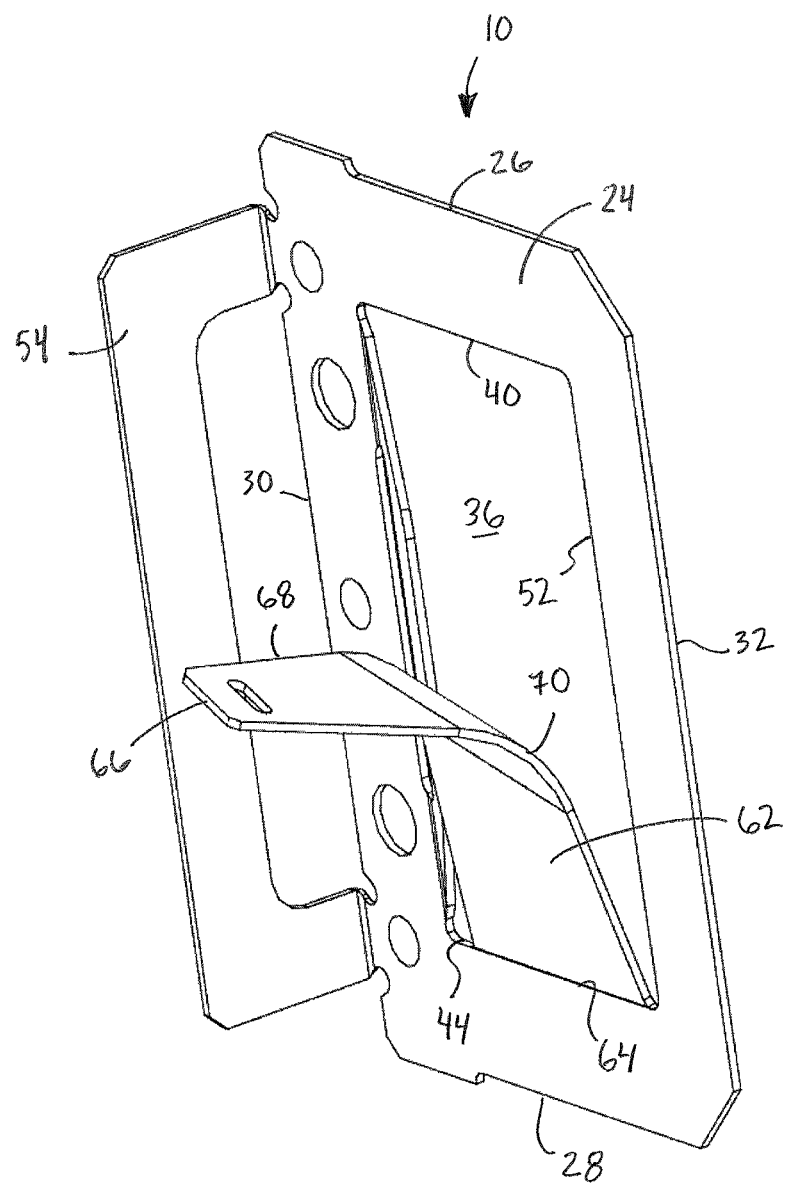
FIG. 4 is a rear perspective view of the support bracket of FIG. 2, illustrating the retention member in the deflected configuration.

With reference to FIGS. 2-4, each support 10 includes a body 24 which is formed as a substantially planar bracket. The body 24 has a first longitudinal end 26, an opposite second longitudinal end 28, a front edge 30, and a rear edge 32. As shown in FIG. 1, the body 24 may be dimensioned to be coupled to and lie flat against the side wall 14 of the electrical box 12. The body 24 includes a central aperture 36 that is defined by opposing top and bottom inner edges 40, 44, and opposing front and back inner edges 48, 52.

In some embodiments (not shown), the support 10 is coupled to the side wall 14 via at least one tab that extends from the front edge 30 of the body 24. The tab has a substantially U-shape having a first end attached to the front edge 30 and a second end extending toward the second side edge 32 such that the tab is slid over the front edge 30. The tab may be configured so that the space between the ends of the tab allow for a friction fit to the side wall 14 so as to grip the side wall 14. The tab may have a hook that engages with the electrical box 12 to secure the support 10 to the electrical box 12. The hook resists separation of the supports 10 from the electrical box 12 during installation and during use. The tab and corresponding hook are described in further detail in U.S. Application Publication No. 2015/0263499, which is incorporated herein by reference. In some embodiments, the support 10 is coupled to the side wall 14 by fasteners (e.g., screws) or adhesive. In some embodiments, the support 10 is welded to the side wall 14. In some embodiments, the support 10 is formed integrally with the side wall 14 of the electrical box 12.

In the illustrated embodiment, a pair of supports are coupled to the electrical box 12, with each support 10 coupled to one side of the box 12. The supports 10 include a first or right support 10 and a second or left support 10'. Each of the right and left supports 10, 10' is a mirror image of the other such that the front edge 30 of each support 10, 10' is positioned proximate the front opening 18 when coupled to the left and right side walls 14, respectively. For brevity's sake, only the right support 10 is described in detail below. In some embodiments, at least one of the supports 10, 10' can be coupled to one or more end walls 16 or combinations of the end walls 16 and side walls 14 of the electrical box 12.

Figure 5:
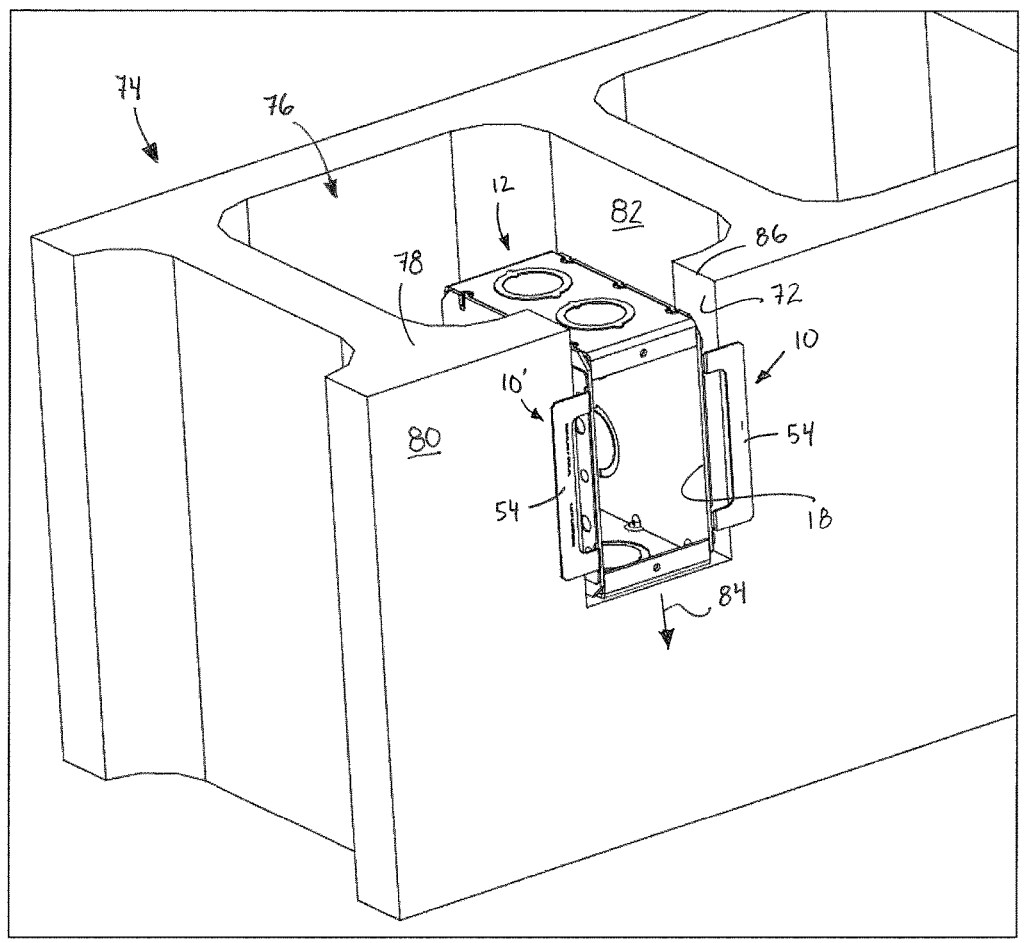
FIG. 5 is a front perspective view of the support brackets and electrical box of FIG. 1 positioned in a block.

With continued reference to FIGS. 2-4, the support 10 further includes a first flange 54 that extends outwardly from the front edge 30 of the body 24 to position the support 10 and the electrical box 12 relative to the outer surface 80 of the block 74 (FIG. 5). The first flange 54 includes a pair of legs 56 that are connected to the front edge 30. The first flange 54 extends substantially perpendicular to the plane of the body 24 away from the opening 18 when the support 10 is coupled to the side wall 14. In the illustrated embodiment, the first flange 54 has a longitudinal length less than a length of the body 24 defined between the opposing first and second longitudinal ends 26, 28 and a width sufficient to contact the outer surface 80 of the block 74 to stabilize and orient the electrical box 12.

The support 10 further includes a second flange 58 that extends from a front inner edge 48 within the central aperture 36 to position and center the support 10 and the electrical box horizontally within the opening 12. The second flange 58 includes a pair of angled legs 60 that couple the second flange 58 to the front inner edge 48 of the body 24. The second flange 58 extends at angle relative to the plane of the body 24 away from the opening 18 when the support 10 is coupled to the side wall 14 and is generally parallel to the first flange 54. In the illustrated embodiment, the second flange 58 has a longitudinal length less than a length of the central aperture 36 defined between the top and bottom inner edges 40, 44. The second flange 58 also has a width sufficient to contact the outer wall 78 within the opening 72 to stabilize, orient, and center the electrical box 12 within the opening 72. The angle of the second flange 58 relative to the body 24 for each of the supports 10, 10' can be adjusted to center the electrical box 12 horizontally within the opening 72.

In the illustrated embodiment, the support 10 is formed from sheet metal, and the flanges 54, 58 may be formed by bending a portion of the sheet metal during manufacture or during installation of the support 10 in the block 74. In some embodiments, the first flange 54 can be formed as a tab extending in the plane of the body 24, or parallel to the plane of the body 24. In some embodiments, the first flange 54 may be removable or separable from the body 24 of the support 10. For example, once the electrical box 12 is installed and construction of the structure is complete, the first flange 54 can be separated from the support 10. In some embodiments, the first flange 54 is connected to the support 10 by a frangible portion forming a break line so that the first flange 54 can be separated from the support 10 by bending along the break line.

With continued reference to FIGS. 2-4, the support 10 further includes a retention member 62. The retention member 62 has a first end 64 and a second distal end 66. The retention member 62 is connected at the first end 64 to the bottom inner edge 44 of the central aperture 36 of the body 24 of the support 10 and extends along a length of the retention member to the second distal end 66 generally parallel to the first flange 54. In some embodiments, the retention member 62 may extend from the top inner edge 40, the front inner edge 48, or the back inner edge 52 of the central aperture 36. In a first, initial (undeformed) configuration, the retention member 62 is entirely positioned within the central aperture 36 and lies in the plane of the body 24.

The retention member 62 has a first longitudinal edge 68 adjacent the front inner edge 48 of the central aperture 36 and a second longitudinal edge 70 adjacent the back inner edge 52 of the central aperture 36. The first longitudinal edge 68 is tapered away from the first flange 54 and toward the second longitudinal edge 70 from the first end 64 to the second end 66. The second longitudinal edge 70 is parallel to the back inner edge 52 of the central aperture 36. Accordingly, the second end 66 is narrower than the first end 64. In some embodiments, both of the first and second longitudinal edges 68, 70 may be tapered inwards toward each other, or they may be parallel to one another, such that the first and second ends 64, 66 are generally the same width.

The retention member 62 is deformable along the length of the retention member 62 from the first configuration to a second, deformed or deflected configuration. In the first configuration the retention member 62 lies in the plane of the body 24, as shown in FIG. 2. In the deflected configuration, the second end 66 of the retention member 62 is bent away from the body 24 so that at least the second end 66 of the retention member 62 is extended away from the body 24, as shown in FIGS. 3-4.

In the illustrated embodiment, the retention member 62 has an elongated slot or aperture 90 adjacent the second end 66. The slot 90 extends through the retention member 62 and may be engaged by a tool (e.g., a flathead screwdriver) to assist a user in bending the retention member 62 into the deflected configuration.

In the illustrated embodiment, the support 10 is a single piece unitary member. In particular, the support 10 is made from sheet steel that is cut and folded to form the various tabs and flanges. The steel has sufficient strength and resilience to secure the electrical box in the opening of the building block as discussed above, but is flexible enough to allow the retention member 62 to be manually deformed. In alternate embodiments, the support 10 can be made of other material such as a molded one-piece plastic material.

Each of the left and right supports 10, 10' is attached to each of the corresponding side walls 14 of the electrical box 12. In other embodiments, only one of the left and right supports 10, 10' may be used depending on the location of the opening 72 in the block 74, the dimensions of the opening 72 in the block 74, and the shape of the hollow core 76 of the building block. The supports 10, 10' may be attached to the side walls 14 by fasteners, friction fit clips, welding, adhesive, or any other method for securing the supports 10, 10' to the side walls 14. In some embodiments, the supports 10, 10' may be integrally formed with the side walls 14.

Referring now to FIG. 5, the supports 10, 10' are configured to support the electrical box within an opening 72 cut or formed into a structure (e.g., a brick or a building block 74) during construction of a wall. The building block 74 has a cavity forming a hollow core 76 with an outer wall 78 having an outer surface 80 and an inner surface 82.

Figure 6:
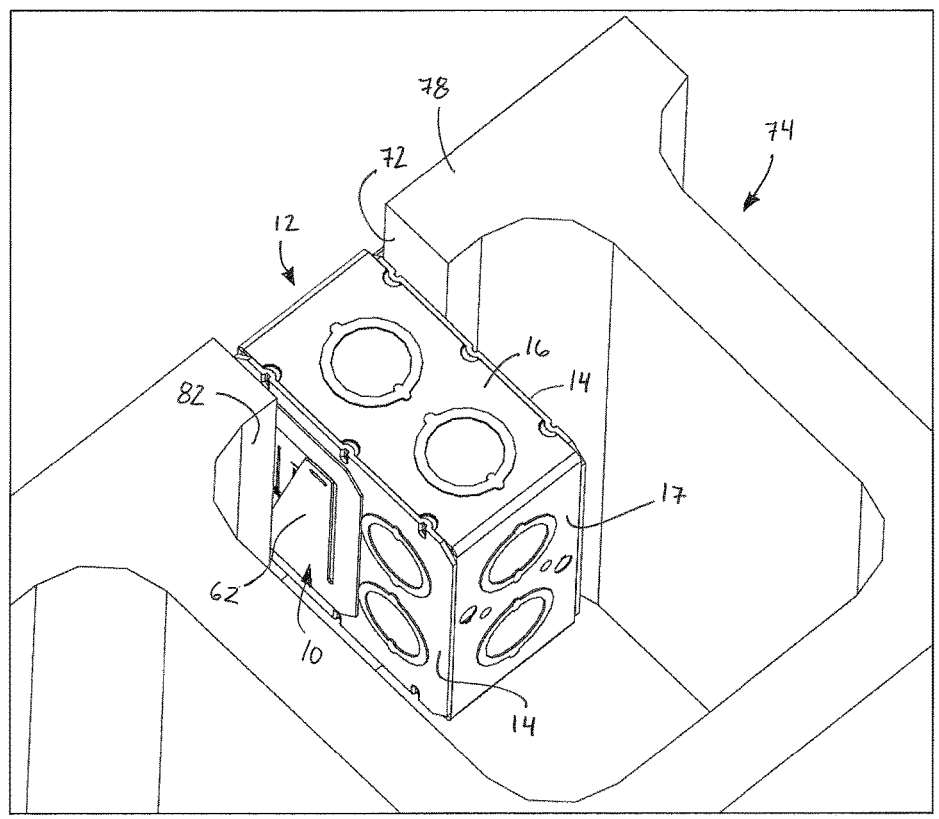
FIG. 6 is a rear perspective view of the support brackets and electrical box of FIG. 1 positioned in the block.

The opening 72 is formed in an edge of the block 74 along an edge such that the opening 72 has an open side 86. The assembly of the supports 10 and the electrical box 12 slides into the opening 72 of the block 74 in a direction parallel to the front face 80 of the block 74 (i.e., in the direction of arrow 84 shown in FIG. 5) while both the retention members 62 (FIG. 6) are in the first (undeformed) configuration. Before sliding the assembly of the supports 10 and the electrical box 12 into the opening 72 of the second flanges 58 are each bent at an angle relative to the body 24 of each support 10, 10' so that the second flanges 58 contact the outer wall 78 to center the electrical box 12 within the opening 72. Mortar may be applied to the outer wall 78 within the opening 72 before and/or after sliding the assembly into the opening 72 so that the second flanges 58 are embedded in the mortar. During the installation, the first flange 54 is bent to contact the outer surface 80 of the block 74 (FIG. 5). The first flange 54 may be bent before or after the electrical box 12 and the support 10 are slid into position within the opening 72.

Figure 7:
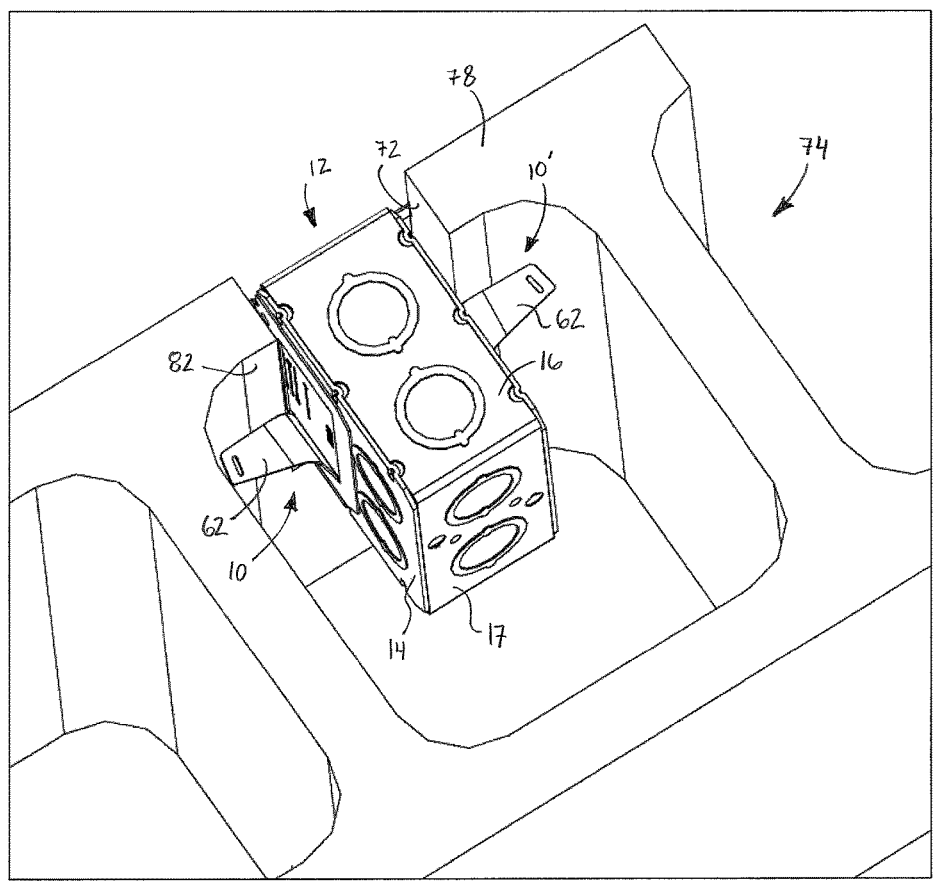
FIG. 7 is a rear perspective view of the support brackets and electrical box of FIG. 1 positioned in the block, illustrating the retention members of each support bracket in the deflected configuration.

Once in position, the second end 66 of the retention member 62 is manually bent away from the body 24 and downward so that the first longitudinal edge 68 contacts the inner surface 82 at an edge of the opening 72 in the deflected configuration (FIG. 7). This is repeated for the retention member 62 of each support 10, 10' coupled to the side walls 14. Accordingly, the outer wall 78 of the block 74 is frictionally engaged between the retention members 62 and the corresponding flanges 60 to secure the electrical box 12 in place.

Due to the taper of the first longitudinal edge 68, the retention member 62 can securely engage various widths of the outer wall 78 by bending the retention member 62 until the first longitudinal edge 68 contacts the inner surface 82 at an edge of the opening 72 (i.e., the retention member 62 is bent more or less depending on the width of the outer wall 78). In the deflected configuration, the retention members 62 secure the electrical box 12 in place during construction and during use of the electrical box 12 so as to prevent separation and movement of the electrical box 12 with respect to the block 74. Continuing to bend the retention member 62 causes the first longitudinal edge 68 to act as a wedge to further secure the electrical box 12 in place within the opening 72.

The retention member 62 may be fully deformed into position before or after sliding the electrical box and support assembly into place within the opening 72. Alternatively, the retention member 62 may be partially deformed before being slid into place, and then fully deformed to securely engage the first longitudinal edge 68 of the retention member 62 with the inner surface 82 of the block 80.

In some embodiments, mortar may be applied within the opening 72 around the electrical box 12, such that the second flanges 58 are embedded within the mortar. The mortar may be applied before and/or after the assembly is positioned within the opening 72 of the block 74. The mortar is then allowed to cure to secure the assembly of the electrical box 12 and the support 10 within the opening 72. Once the mortar has cured, the first flange 54 of each support 10 may be separated from the support 10. In some embodiments, the first flange 54 may be separated by bending along a frangible break line until the first flange 54 breaks away from the body 24 of the support 10 so that the open front 18 of the electrical box 12 is generally flush with the outer surface 80 of the block 74.

FIGS. 8-11 illustrate another support 410 for use with the electrical box 12 in accordance with another embodiment. The support 410 of FIGS. 8-11 may be used in place of the supports 10, 10' of FIGS. 1-7 on the electrical box 12. The manner of coupling the support 410 of FIGS. 8-11 to the electrical box 12 is substantially identical to that of the support 10 of FIGS. 1-7. In addition, the structure of the support 410 of FIGS. 8-11 is similar to the structure of the support 10 of FIGS. 1-7, and only differences are described in detail. Similar features are identified with like reference numerals plus 400 and are not described again in detail.

Figure 9:
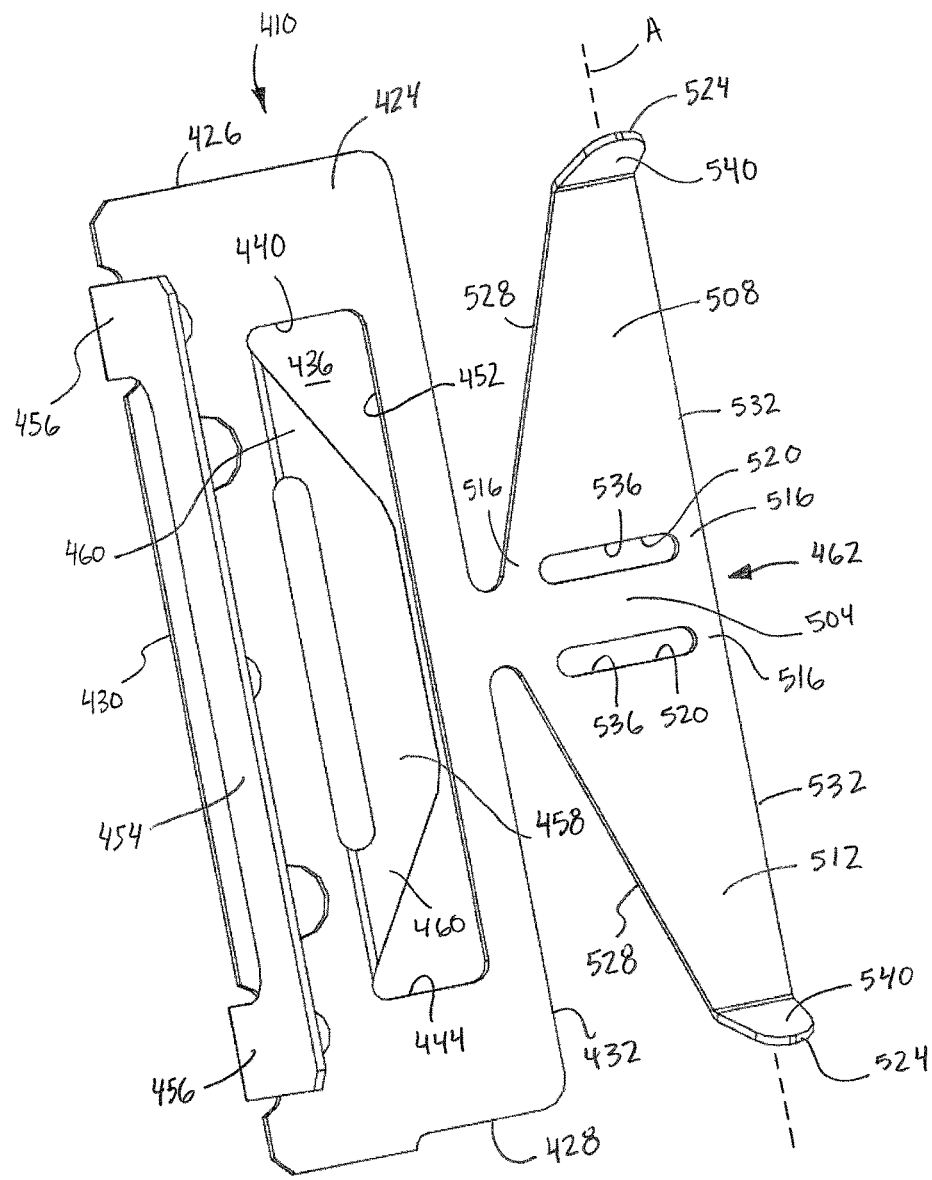
FIG. 9 is a perspective view of one of the support brackets of FIG. 8.

With reference to FIG. 9, the retention member 462 is connected to a center of the rear edge 432 of the body 424 by an intermediate or connecting portion 504 that extends perpendicularly from the rear edge 432 within the plane of the body 424. The retention member 462 includes a first portion 508 and a second portion 512 that are mirror halves across the connecting portion 504. Each of the first portion 508 and the second portion 512 has a first end 520 connected to the connecting portion 504 by two connecting legs 516. Each of the first and second portions 508, 512 extends along a length from the first end 520 to a second distal end 524 such that the first and second portions 508, 512 generally extend away from each other in opposite directions along an axis A parallel to the rear edge 432 (FIG. 9). In some embodiments, the first and second portions 508, 512 may extend at an angle with respect to the axis A.

Each of the first portion 508 and the second portion 512 has first and second longitudinal edges 528, 532 that extend from the first ends 520 of each of the first and second portions 508, 512 to the corresponding second ends 524. The first longitudinal edges 528 are closer to the rear edge 432 of the body 424 than the second longitudinal edges 532. The second longitudinal edges 532 are collinear and parallel to the rear edge 432. Each of the first longitudinal edges 528 tapers toward the second longitudinal edges 532 from the first end 520 toward the second end 524. Accordingly, the second end 524 of each of the first and second portions 508, 512 is narrower than the first end 520.

Figure 8:
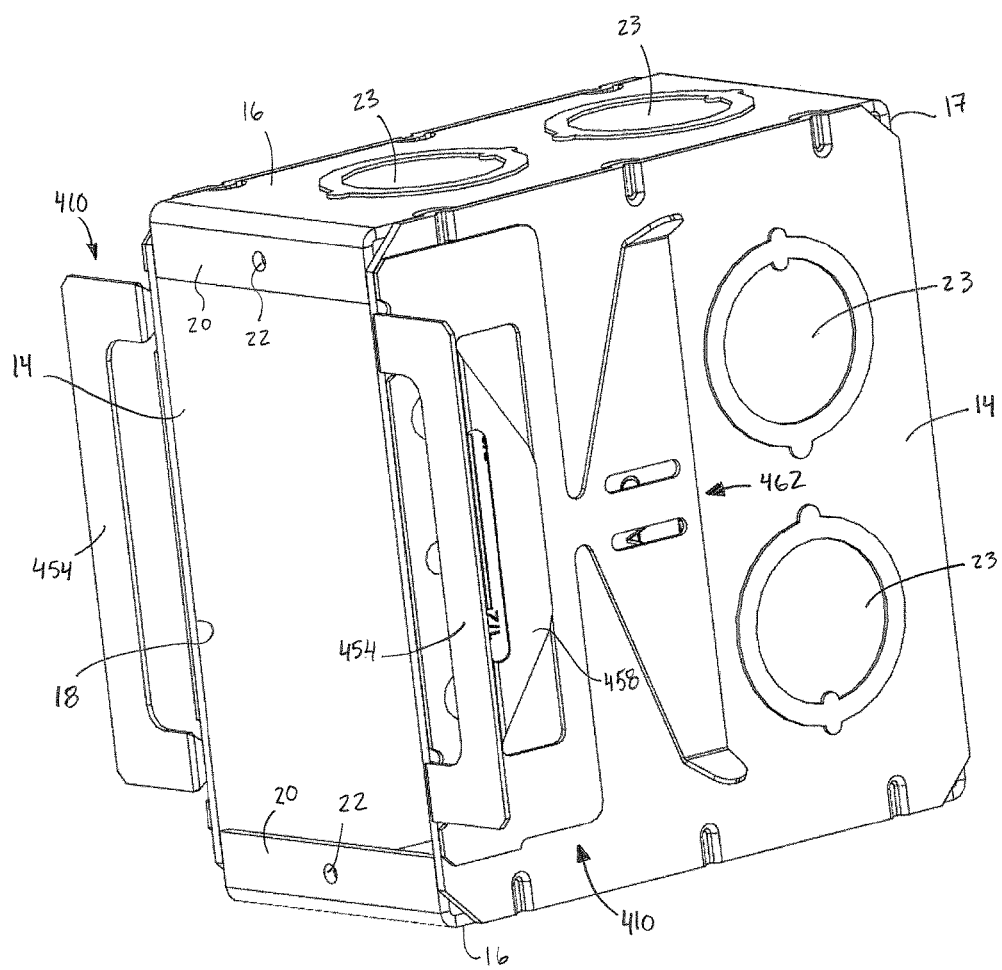
FIG. 8 is a perspective view of support brackets and an electrical box in accordance with another embodiment.
Figure 10:
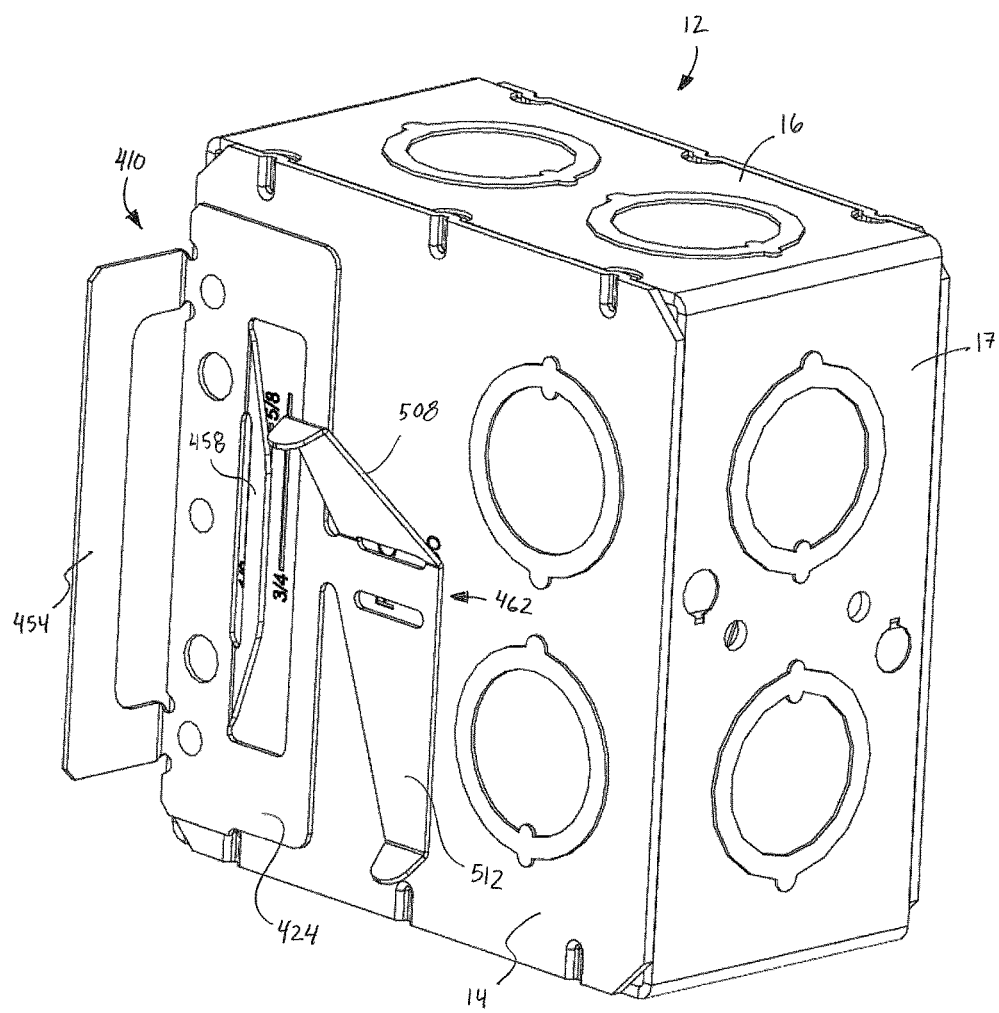
FIG. 10 is a rear perspective view of the support brackets and electrical box of FIG. 8, illustrating a portion of a retention member of one of the support brackets in a deflected configuration.
Figure 11:
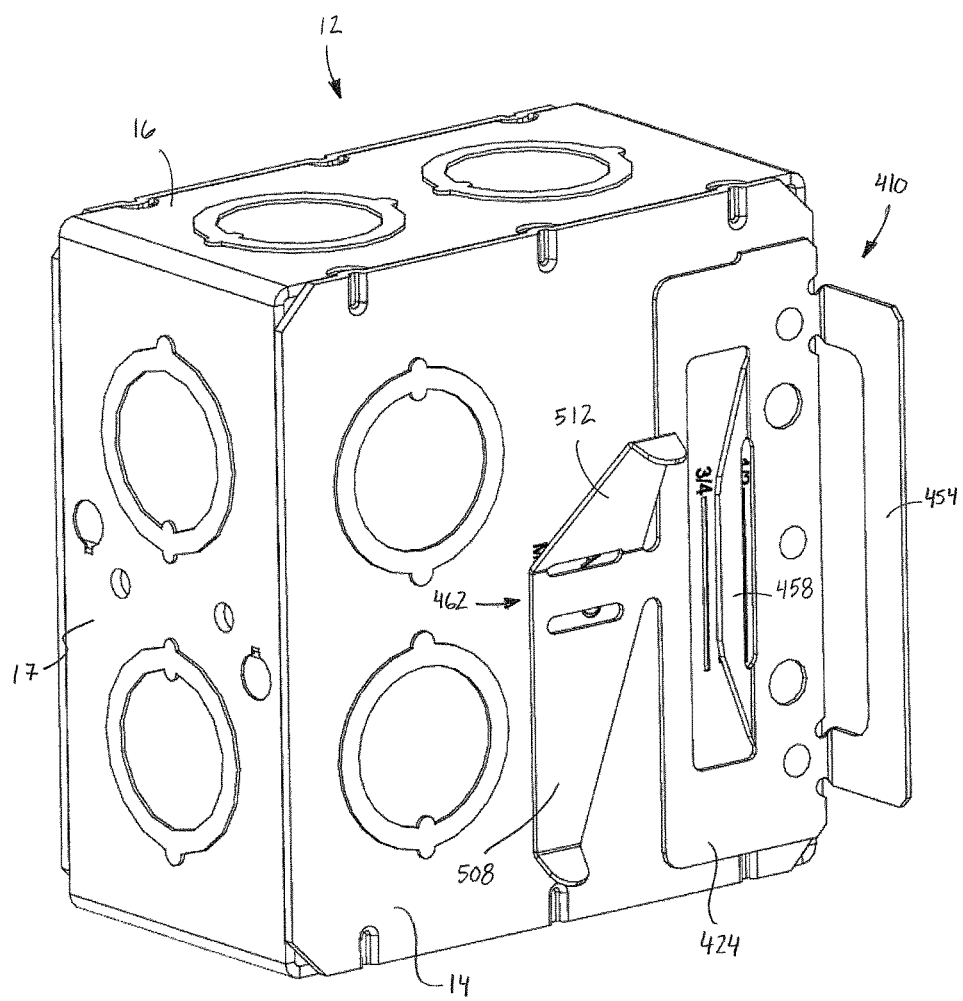
FIG. 11 is another rear perspective view of the support brackets and electrical box of FIG. 8, illustrating a portion of a retention member of one of the support brackets in a deflected configuration.

Each of the first and second portions 508, 512 of the retention member 462 is independently deformable along the length of the retention member 462. Each of the first and second portions 508, 512 of the retention member 462 lies in the plane of the body 424 when in a first, initial (undeformed) configuration, as shown in FIGS. 8 and 9. Each of the first and second portions 508, 512 may be independently bent from the first configuration into a second, deformed or deflected configuration. The second end 524 of the first portion 508 may be bent away from the body 424 so that the first portion 508 extends at an angle from the body 424, while the second portion 512 remains in the plane of the body 424, as shown in FIG. 10. Alternatively, the second end 524 of the second portion 512 may be bent away from the body 424 so that the second portion 512 extends at an angle from the body 424, while the first portion 508 remains in the plane of the body 424, as shown in FIG. 11. Accordingly, the support 410 can be used on either of the side walls 14 of the electrical box 12. For example, the first portion 508 can be bent for the support 410 on the right side wall 14 (FIG. 10) and the second portion 512 can be bent for the support 410 on the left side wall 14 (FIG. 11). Therefore, only a single version of the support 410 is needed for both side walls 14 of the electrical box 12. This reduces the number of different parts that need to be manufactured and prevents the user from making the mistake of coupling the support 410 to an improper side. The first portion 508 and the second portion 512 of the retention member 462 are separately deformable first and second retention members that may be deformed independently depending on the orientation of the support 410 (i.e., whether it is coupled to the right or left side wall 14).

As best shown in FIG. 9, the connecting legs 516 are narrower than the adjacent connecting portion 504 and narrower than the first end 520 of each of the first and second portions 508, 512. A gap 536 is defined between the connecting portion 504, the first end 520, and the legs 516. Accordingly, as force (e.g., a downward force along the axis A to the second end 524) is applied to each of the first and second portions 508, 512 bending occurs at the legs 516.

In the illustrated embodiment, the second end 524 of each of the first and second portions 508, 512 has a tab 540 that extends at an angle away from the retention member 462. The tab 540 may be used to assist a user in bending the corresponding one of the first portion 508 and the second portion 512 of the retention member 462 into the deflected configuration. The user may simply push down on the tab 540 with their thumb or a tool to bend the first portion 508 or the second portion 512.

In the illustrated embodiment, one support 410 is attached to each of the corresponding side walls 14 of the electrical box 12. In other embodiments only one support 10 may be used with one of the side walls 14 depending on the location of the opening 72 in the block 74, the dimensions of the opening 72 in the block 74, and the shape of the hollow core 76 of the block 74. The supports 10 may be attached to the side walls 14 by fasteners, friction fit clips, welding, adhesive, or any other method for securing the supports 10 to the side walls 14. In some embodiments, the supports 10 may be integrally formed with the side walls 14.

The assembly of the support 410 and the electrical box 12 is received in the opening 72 cut in the block 74 similar to the assembly of the support 10 and the electrical box 12 of FIGS. 1-7. Once in place, the first flange 454 is bent to contact the outer surface 80 of the block 74. In some embodiments, the first flange 454 is bent before being positioned within the opening 72. The first portion 508 of the retention member 462 of the support 410 that is coupled to the right side wall 14 is manually deformed so that the second end 66 is bent downward and away from the body 424 into the deflected configuration. The first longitudinal edge 528 contacts the inner surface 82 of the block 74 (FIG. 10). Similarly, the second portion 512 of the retention member 462 of the support 410 that is coupled to the left side wall 14 is manually deformed so that the second end 66 is bent downward and away from the body 424 so that the first longitudinal edge 528 contacts the inner surface 82 of the block 74 (FIG. 11). Accordingly, the outer wall 78 of the block 74 is frictionally engaged between the first and second portions 508, 512 of the retention members 462 and the corresponding flanges 460 of each of the supports 410 to secure the electrical box in place relative to the block 74.

Due to the taper of the first longitudinal edge 528, the first and second portions 508, 512 of the retention member 462 can engage various widths of the outer wall 78 by bending the first or second portion 508, 512 until the first longitudinal edge 528 contacts the inner surface 82 of the opening 72 (i.e., bending the first or second portion 508, 512 more or less depending on the width of the outer wall 78). In the deflected configurations each of the first and second portions 508, 512 has enough resilient force to secure the electrical box 12 in place during construction of the wall and during use of the electrical box 12. Continuing to bend the first or second portion 508, 512 of the retention member 462 causes the first longitudinal edge 528 to act as a wedge to further secure the electrical box 12 in place within the opening 72.

Each of the first and second portions 508, 512 of each retention member 462 may be fully deformed into position before or after sliding the electrical box and support assembly into place within the opening 72. Alternatively, one of the first and second portions 508, 512 of the retention members 462 may be partially deformed before being slid into place, and then once in place, fully deformed to securely engage the first longitudinal edge 528 of the respective first and second portions 508, 512 of the retention members 462 with the inner surface 82 of the block 74.

In the embodiments shown in FIGS. 1-11, the supports 10, 410 are attached directly to the side walls 14 of the electrical box 12. In some embodiments the support 10, 410 is coupled to an electrical box having an extension collar in substantially the same manner as in the embodiments of FIGS. 1-11. The collar is attached to an electrical box having a dimension larger than the opening in the block. A cover plate extending from the base of the collar is attached to the open end of the electrical box. The collar may be dimensioned for supporting an electrical wiring device and may include inwardly extending flanges at an end wall for fixing the hooks of the support 10, 410 to the open end of the collar.

In general, the supports mount an electrical box in an opening of a structure such as a wall. Each support includes a retention member that is manually deformed to a deflected position for retaining the electrical box in the opening. More particularly, the support secures the electrical box in an opening formed in a hollow core masonry block or an opening in a concrete wall.

Although aspects have been described in detail with reference to certain preferred embodiments, variations and modifications exist within the scope and spirit of one or more independent aspects as described. Various features and advantages are set forth in the following claims.

What is claimed is:

1. A support for mounting an electrical box in an opening formed in a masonry block or a concrete wall, the support comprising:
   a planar body configured to be coupled to a first side wall of the electrical box, the body including at least one side edge;
   a flange coupled to the side edge of the body and extending substantially perpendicular to a plane of the body, the flange configured to contact an outer surface of the block and to orient an outer edge of the electrical box relative to the masonry block or concrete wall; and
   a retention member coupled to the body, the retention member having an end, at least a portion of the retention member being movable from a first configuration to a second configuration in which the portion of the retention member is positioned away from the body and contacts the masonry block or concrete wall.

2. The support of claim 1, wherein the retention member is substantially planar, and wherein the retention member is coplanar with the body when in the first configuration.

3. The support of claim 1, wherein the retention member has a longitudinal edge extending to the end of the retention member, and wherein the longitudinal edge contacts the block in the second configuration.

4. The support of claim 3, wherein the longitudinal edge is tapered away from the flange to the end of the retention member.

5. The support of claim 1, wherein the end is a first end and the portion is a first portion, wherein the retention member has a second portion and a second end, and wherein the second portion is movable from a first configuration to a second configuration in which the second portion of the retention member is positioned away from the body and contacts the block.

6. The support of claim 5, wherein the first portion of the retention member and the second portion of the retention member generally extend in opposite directions when both are in the first configuration.

7. The support of claim 1, wherein the retention member is coupled to the body by a connecting leg, and wherein a width of the connecting leg is narrower than a width of the retention member adjacent the connecting leg.

8. The support of claim 1, wherein an aperture is defined in the retention member adjacent the end of the retention member.

9. The support of claim 1, wherein the retention member has a bent tab extending at an angle from the retention member at the end of the retention member.

10. The support of claim 1, wherein the block is captured between the flange and the retention member to support the electrical box relative to the block.

11. An electrical box assembly comprising:
    an electrical box having a first side wall, a second side wall, and an open front positioned between the first side wall and second side wall;
    a support including,
       a body having at least one side edge, the body being coupled to the first side wall of the electrical box;
       a flange coupled to the side edge of the body and extending substantially perpendicular to a plane of the body, and
       a retention member coupled to the body, the retention member having an end, at least a portion of the retention member being movable from a first configuration to a second configuration in which the portion of the retention member extends away from the body, the retention member configured to contact an opposite side of a block wall from the flange.

12. The electrical box assembly of claim 11, wherein the retention member is substantially planar, and wherein the retention member is coplanar with the body when in the first configuration.

13. The electrical box assembly of claim 11, wherein the retention member has a longitudinal edge extending to the end, and wherein the longitudinal edge contacts the block in the second configuration.

14. The electrical box assembly of claim 13, wherein the longitudinal edge tapers away from the flange to the end.

15. The electrical box assembly of claim 11, wherein the end is a first end and the portion is a first portion, wherein the retention member further includes a second portion and a second end, wherein the second portion of the retention member is movable from a first configuration to a second configuration in which the second portion of the retention member extends away from the body.

16. The electrical box assembly of claim 15, wherein the first portion of the retention member and the second portion of the retention member generally extend in opposite directions when both are in the first configuration.

17. The electrical box assembly of claim 11, wherein the retention member is coupled to the body by a connecting leg, and wherein a width of the connecting leg is narrower than a width of the retention member adjacent the connecting leg.

18. The electrical box assembly of claim 11, wherein the block is captured between the flange and the retention member to support the electrical box relative to the block.

19. The electrical box assembly of claim 11, wherein the support is a first support, and further comprising:
    a second support including,
       a second body having at least one side edge, the body being coupled to the second side wall of the electrical box,
       a second flange coupled to the side edge of the second body and extending substantially perpendicular to a plane of the second body, and a second retention member coupled to the second body, the second retention member having a second end, at least a portion of the second retention member being movable from a first configuration to a second configuration in which the second retention member extends away from the second body, the second retention member configured to contact an opposite side of a block wall from the second flange.

20. A method of mounting an electrical box in an opening of a masonry block or a concrete wall, the method comprising the steps of:
   positioning the electrical box and a support in the opening in the block;
   positioning a flange of the support against an outer surface proximate the opening; and
   deforming a retention member of the support such that the retention member extends away from a planar body until the retention member contacts an edge proximate the opening.

21. The method of claim 20, further comprising coupling the body of the support to a side wall of the electrical box.

22. The method of claim 20, further comprising bending the flange so as to extend perpendicular to the plane of the body.

23. The method of claim 20, wherein the retention member has a longitudinal edge extending to an end thereof, wherein the longitudinal edge contacts the block, and wherein the longitudinal edge is tapered away from the flange toward the end.

24. The method of claim 20, further comprising removing the flange from the support.

25. The method of claim 20, further comprising capturing the block between the flange and the retention member.

* * * * *